(12) United States Patent
Gutknecht et al.

(10) Patent No.: US 7,998,519 B2
(45) Date of Patent: *Aug. 16, 2011

(54) YOGURT-CHEESE PRODUCTS, AND METHODS OF MAKING THE SAME

(75) Inventors: Jon R. Gutknecht, South Burlington, VT (US); John B. Ovitt, Franklin, VT (US)

(73) Assignee: Franklin Foods, Inc., Delray Beach, FL (US)

( * ) Notice: Subject to any disclaimer, the term of this patent is extended or adjusted under 35 U.S.C. 154(b) by 893 days.

This patent is subject to a terminal disclaimer.

(21) Appl. No.: 11/151,672

(22) Filed: Jun. 13, 2005

(65) Prior Publication Data

US 2005/0233049 A1 Oct. 20, 2005

Related U.S. Application Data

(63) Continuation-in-part of application No. 10/369,163, filed on Feb. 19, 2003, now Pat. No. 7,083,815, and a continuation-in-part of application No. PCT/US2004/002538, filed on Jan. 29, 2004, and a continuation-in-part of application No. 11/006,918, filed on Dec. 8, 2004, now Pat. No. 7,572,473.

(51) Int. Cl.
*A23C 19/00* (2006.01)

(52) U.S. Cl. ........ 426/582; 426/34; 426/580; 426/583

(58) Field of Classification Search .......... 426/34, 426/36, 519, 520, 521, 580, 582, 583
See application file for complete search history.

(56) References Cited

U.S. PATENT DOCUMENTS

| | | |
|---|---|---|
| 3,749,583 A | 7/1973 | Cox et al. |
| 3,929,892 A | 12/1975 | Hynes et al. |
| 4,110,476 A | 8/1978 | Rhodes |
| 4,293,573 A | 10/1981 | Bradley, Jr. et al. |
| 4,341,801 A | 7/1982 | Weissman |
| 4,410,549 A | 10/1983 | Baker |
| 4,434,184 A | 2/1984 | Kharrazi |
| 4,724,152 A | 2/1988 | Baker et al. |
| 4,749,584 A | 6/1988 | Wirchansky et al. |
| 4,837,035 A | 6/1989 | Baker et al. |
| 4,837,036 A | 6/1989 | Baker et al. |
| 4,952,414 A | 8/1990 | Kaufman et al. |
| 4,956,186 A | 9/1990 | Streiff et al. |
| 4,968,512 A | 11/1990 | Kharrazi |
| 5,009,867 A | 4/1991 | Kratochvil |
| 5,079,024 A | 1/1992 | Crane |
| 5,143,742 A | 9/1992 | Maroudas |
| 5,180,604 A | 1/1993 | Crane et al. |
| 5,252,352 A | 10/1993 | Banach et al. |
| 5,356,639 A | 10/1994 | Jameson et al. |
| 5,378,478 A | 1/1995 | Miller et al. |
| 5,395,631 A | 3/1995 | Sweeney |
| 5,449,523 A | 9/1995 | Hansen et al. |
| 5,520,948 A | 5/1996 | Kvamme |
| 5,676,984 A | 10/1997 | Bohanan et al. |
| 5,679,396 A | 10/1997 | Finnocchiaro |
| 5,820,903 A | 10/1998 | Fleury et al. |
| 5,846,592 A | 12/1998 | Alderliesten et al. |
| 5,882,704 A | 3/1999 | Yamaguchi et al. |
| 5,916,608 A | 6/1999 | Lanting |
| 6,025,008 A | 2/2000 | Akahoshi et al. |
| 6,036,979 A | 3/2000 | Hormann |
| 6,096,352 A | 8/2000 | Kijowski et al. |
| 6,136,351 A | 10/2000 | Nauth et al. |
| 6,183,802 B1 | 2/2001 | Silva et al. |
| 6,365,205 B1 | 4/2002 | Wahlgren |
| 6,406,736 B1 | 6/2002 | Han |
| 6,416,797 B1 | 7/2002 | Han et al. |
| 6,419,974 B1 | 7/2002 | Silva et al. |
| 6,544,567 B1 | 4/2003 | Davis et al. |
| 7,083,815 B2 * | 8/2006 | Gutknecht et al. ............ 426/36 |
| 7,258,886 B2 * | 8/2007 | Brue et al. ................ 426/582 |
| 2002/0068112 A1 | 6/2002 | Murphy et al. |
| 2003/0031758 A1 | 2/2003 | Koss et al. |
| 2005/0064067 A1 | 3/2005 | Schmitt |
| 2005/0084565 A1 | 4/2005 | Gutknecht |
| 2005/0180962 A1 | 8/2005 | Raz |
| 2006/0068075 A1 | 3/2006 | Fultz et al. |
| 2006/0141096 A1 | 6/2006 | Gutknecht |
| 2006/0246180 A1 | 11/2006 | Galal |
| 2007/0003666 A1 | 1/2007 | Gutknecht |

FOREIGN PATENT DOCUMENTS

| | | |
|---|---|---|
| DE | 3314551 C1 | 11/1984 |
| IT | 1178926 | 9/1987 |
| WO | WO96/37114 | 11/1996 |
| WO | WO99/62348 | 12/1999 |

OTHER PUBLICATIONS

Newlander, C.E., "The Babcock Test: Notes on its Use in Determining TM Percentage of Fat in Whole Milk, Skim-Milk, Buttermilk, Cream and Whey," Bulletin No. 2, Extension Series, Mar. 1916, pp. 1-11, Publisher: Michigan Agricultural College, Extension Division.

(Continued)

*Primary Examiner* — Leslie Wong
(74) *Attorney, Agent, or Firm* — Jay M. Brown (57) ABSTRACT

Techniques for making a yogurt-cheese-oil product, comprising steps of: providing a milkfat-oil fluid comprising butterfat and an oil; pasteurizing the milkfat-oil fluid to produce a cheese-oil precursor; combining yogurt with the cheese-oil precursor to produce a combined yogurt-cheese-oil precursor; and homogenizing and acidifying the combined yogurt-cheese-oil precursor; producing a yogurt-cheese-oil product. Yogurt-cheese-oil products: comprising between about 10% by weight and about 80% by weight of total butterfat; comprising between about 2% by weight and about 52.5% by weight of an oil; comprising between about 10% by weight and about 50% by weight of yogurt; and yielding less than about 1% syneresis by weight after 15 hours at about 74° F. to about 75° F.

23 Claims, 2 Drawing Sheets

OTHER PUBLICATIONS

Tamime et al., "Yoghurt Science and Technology", Pergamon Press, Oxford, pp. 250, Fig. 5.12 (1985).
Roberfroid, Marcel B., et al., "The Bifidogenic Nature of Chicory Inulin and its Hydrolysis Products", *Journal of Nutrition*, vol. 128, No. 1, pp. 11-19 (American Society for Nutritional Sciences, Jan. 1998).
Zubillaga, M. et al., "Effect of probiotics and functional foods and their use in different diseases", *Nutrition Research*, vol. 21, pp. 569-579 (Elsevier Science Inc. 2001).
U.S. Food & Drug Administration, Grade "A" Pasteurized Milk Ordinance, 2001 Revision.
Waukesha Cherry-Burrell, Votator Scraped Surface Heat Exchangers, 2001.
Danisco, "Distilled monoglycerides" (2005).
BASF Technical Bulletin Beta-carotene 15M Dispersion in Corn Oil (2004).
U.S. Appl. No. 11/453,941, filed Jun. 15, 2006, Gutknecht et al.
U.S. Appl. No. 11/454,756, filed Jun. 16, 2006, Gutknecht et al.
Cerning et al., "Isolation and Characterization of Exopolysaccharides from Slime-Forming Mesophilic Lactic Acid Bacteria," J.Dairy Sci., vol. 75 (1992), pp. 692-699.
Kosin et al., "Microbial and Processing Criteria for Production of Probiotics: A Review," Mar. 2006, Food Technol. Biotechnol. vol. 44 No. 3 pp. 371-379.
U.S. Appl. No. 12/637,556, Gutknecht.
Charteris et al., "Edible table (bio)spread containing potentially probiotic *Lactobacillus* and *Bifidobacterium* species," Int. J. Dairy Tech., Feb. 2002, vol. 55, No. 1, pp. 44-56.

* cited by examiner

FIG. 1

YOGURT-CHEESE PRODUCTS, AND METHODS OF MAKING THE SAME

This application is a continuation in part of commonly owned U.S. patent application Ser. No. 10/369,163, filed on Feb. 19, 2003, now U.S. Pat. No. 7,083,815; and a continuation in part of commonly owned Patent Cooperation Treaty Application Ser. No. PCT/US2004/002538, filed on Jan. 29, 2004; and a continuation in part of commonly owned U.S. patent application Ser. No. 11/006,918, filed on Dec. 8, 2004, now U.S. Pat. No. 7,572,473.

FIELD OF THE INVENTION

The present invention relates to the field of cheese products and methods for making the same. More particularly, the present invention relates to yogurt-cheese products that comprise yogurt and retain whey from milkfat fluid used to make the products. These yogurt-cheese products combine the desirable texture and mouth feel of cheese, having a dramatically improved flavor due to retained whey, with the additionally desirable taste and active culture bacteria health benefits of yogurt.

BACKGROUND OF THE INVENTION

Cream cheese and similar products are ubiquitous in modern diets. They generally have a smooth texture and a bland, unremarkable flavor. Spreadability makes cream cheese convenient to use, which is the primary basis for its choice by consumers over other firmer cheeses and the reason for its high volume consumption as a topping, for example on breads including bagels. In the classic method for making cream cheese, a pasteurized milkfat fluid such as cream, having a butterfat content generally within a range of between about 34.5% by weight and 52% by weight, is the primary raw material. This milkfat fluid is subjected to thorough digestion by lactic acid—producing bacteria, homogenized, and clotted by enzymes or direct acidification. The milkfat fluid is thus transformed into a solid phase referred to as the curd, and a liquid phase referred to as the whey. Most of the butterfat content of the milkfat fluid is retained in the curd; and significant protein content, having nutritional value and much of the desirable potential flavor, remains in the whey. The curd is then processed into the desired cream cheese product, and the whey is discarded, along with its flavor. As a result, cream cheese typically has a bland, dull, virtually unnoticeable taste. The retention of liquid whey in the curd is a problem in itself, as the liquid gradually leaks out of the curd in an unappealing and ongoing separation that is called syneresis. In addition, large scale cream cheese production generates corresponding quantities of often unusable whey, which thus becomes a waste expense and environmental detraction unless some other use can be found for it. Syneresis can similarly be a problem in many other cheese products.

The minimum butterfat content for cream cheese is 33% by weight. It is a pervasive goal in the human diet to consume less fat; and the relatively high butterfat content of a typical cream cheese is not helpful in achieving this goal. Countless attempts have been made to make low-fat cream cheese products, but the resulting cheese products have failed due to unacceptable taste and poor texture. High fat concentrations are also a problem in many other cheese products.

Yogurt, another highly prevalent milk—derived product, has an entirely different consistency than cream cheese, as well as a fundamentally different flavor. In illustration, yogurt is considered to be a food, whereas cream cheese is considered to be a condiment. For example, yogurt, unlike cream cheese, is not a popular topping for bread products such as bagels. On the other hand, yogurt has a robust, desirable flavor. Yogurt also is typically lower than cream cheese in butterfat, cholesterol and sodium, and higher in protein.

A health-conscious consumer might well make the simple observation that nonfat yogurt has a robust, desirable flavor, find the concept of combining yogurt and cream cheese to be desirable, and thus attempt to combine these products together. However, due to the disparate properties of cream cheese and yogurt, including for example their differing consistencies, water content, and food chemistries, the combination of cream cheese and yogurt in mutually appreciable proportions only generates a runny mess. A consumer might then attempt to drain the liquid from the solid phase of the yogurt before combining in the cream cheese, thereby discarding whey from the yogurt. Similar problems can be expected where other types of cheeses are substituted for cream cheese, where an attempt to combine such cheeses with yogurt is made.

Producing a cream cheese having an appealing consistency and utility, for example as a spreadable topping, is not possible by mixing cream cheese and yogurt without also adulterating these ingredients either by discarding whey from the yogurt or cream cheese, or by adding substantial proportions of gums and processed milk byproducts such as milk protein concentrate, whole milk protein, whey protein concentrate, casein, Baker's cheese, yogurt powder, and dry cottage cheese curd. At that point, the product is no longer cream cheese but a processed cheese spread, typically having inferior texture and nutritional value, and a flavor that is either bland or even mildly unpleasant. Efforts have also been made to produce so-called low-fat cream cheese, but again the resulting product has offered a bland, unremarkable and potentially unpleasant flavor. Hence, despite the broad popularity of cream cheese, its use typically entails consumer acceptance of a minimum butterfat content of 33% by weight, along with high cholesterol and sodium, and a bland, unremarkable taste.

In addition to cream cheese, many other currently-available cheese-like dairy products also lack the health benefits of a yogurt. For example, butter products in the form of either spreads or bricks often have very high milkfat concentrations. Further for example, margarine products, which are designed to substitute for butter, often have very high oil concentrations. Neither of these product classes typically comprises substantial concentrations of protein.

Accordingly it would be highly desirable to provide a process for making an improved cheese product from a milkfat fluid, having the consistency of high-milkfat cheese but combining the desirable flavor and nutritional benefits of yogurt with the flavor of whey retained from the milkfat fluid, yielding a robust taste. The resulting yogurt-cheese product would be a welcome substitute for its faintly-tasting high-fat progenitors while simultaneously improving cheese production economics and protecting the environment. Since the butterfat content of yogurt is typically within a range of between about 0% and about 3.25% by weight, and commonly less than about 0.5% by weight, the combination of yogurt into a cheese product also would desirably yield a cheese product having a lower overall butterfat content and a relatively higher protein content. Cholesterol accompanies butterfat, so that the cholesterol content of this product would also be reduced.

SUMMARY OF THE INVENTION

In one implementation, a process for making a yogurt-cheese-oil product is provided, comprising steps of: providing a milkfat-oil fluid comprising butterfat and an oil; pasteurizing said milkfat-oil fluid to produce a cheese-oil precursor; providing a yogurt, and combining said yogurt with said cheese-oil precursor to produce a combined yogurt-cheese-oil precursor; and homogenizing and acidifying said combined yogurt-cheese-oil precursor; producing a yogurt-cheese-oil product.

In another implementation, a yogurt-cheese-oil product is provided: comprising between about 10% by weight and about 80% by weight of total butterfat; comprising between about 2% by weight and about 52.5% by weight of an oil; comprising between about 10% by weight and about 50% by weight of yogurt; and yielding less than about 1% syneresis by weight after 15 hours at about 74° F. to about 75° F.

A more complete understanding of the present invention, as well as other features and advantages of the present invention, will be apparent from the following detailed description and the accompanying drawings.

DETAILED DESCRIPTION

Figure 1:
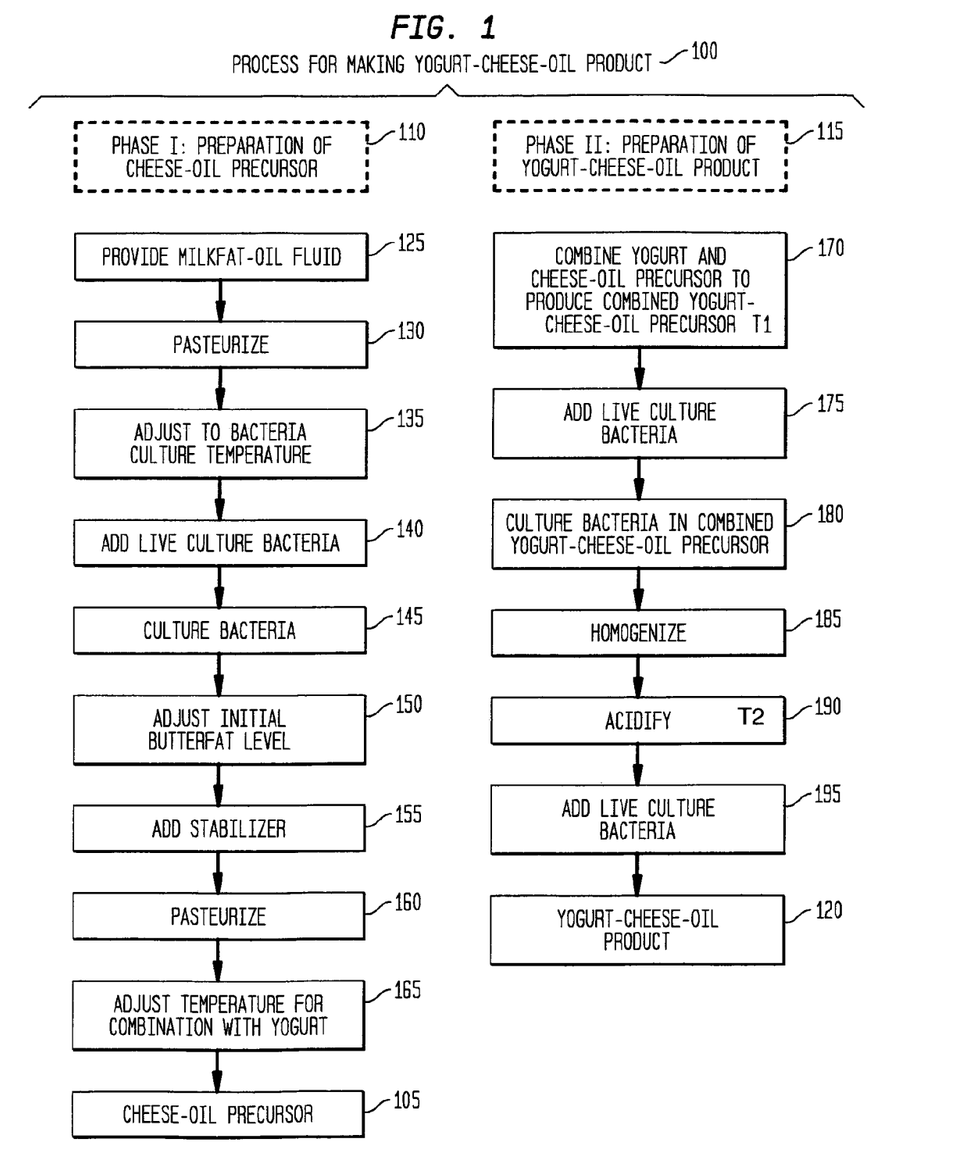
FIG. 1 is a flow chart of an exemplary process for making a yogurt-cheese-oil product according to the present invention.

Referring to FIG. 1, a flow chart of an exemplary process 100 is shown for making a yogurt-cheese-oil product according to the present invention. According to this process, a cheese-oil precursor 105 is produced in phase I generally indicated at 110. Subsequent steps defined in phase II generally indicated at 115 result in production of a yogurt-cheese-oil product 120.

Phase 1 of process 100 begins with provision of a milkfat-oil fluid comprising an oil at step 125. By milkfat is meant a composition comprising the fatty components of edible milk, for example, cow milk. Such fatty components, commonly referred to collectively as butterfat, can include, for example, triacylglycerols, diglycerides, monoacylglycerols, and other lipids. By fluid is meant a liquefied composition comprising milkfat, which can either be directly derived from milk, or reconstituted by hydrating a dehydrated milk product. For example, the milkfat fluid can be cream. The milkfat fluid can be formed from a mixture of sources, including, for example, whole milk, cream, skim milk, and dry milk.

By oil is meant an edible oil of vegetable and/or animal origin. In one embodiment, a vegetable oil is employed, such as, for example, a vegetable oil derived from seeds or fruit of one or more of the following: soy, corn, canola, sunflower, safflower, olive, peanut, cottonseed, sesame, almond, apricot, avocado, coconut, flax, grapeseed, hazelnut, palm, pine, poppy, pumpkin, rice bran, tea, walnut, and wheat. In another embodiment, an animal oil is employed, such as, for example, an animal oil comprising one or more of the following: lard, shortening, suet, and tallow. In one embodiment, the milkfat-oil fluid comprises a concentration of a vegetable oil (weight/weight as a fraction of the milkfat-oil fluid) within a range of between about 3% and about 70%; and the yogurt-cheese-oil product comprises a concentration of a vegetable oil (weight/weight as a fraction of the yogurt-cheese-oil product) within a range of between about 2% and about 52.5%. In another embodiment, the milkfat-oil fluid comprises a weight/weight concentration of a vegetable oil within a range of between about 3% and about 40%; and the yogurt-cheese-oil product comprises a weight/weight concentration of a vegetable oil within a range of between about 2% and about 30%. In another embodiment, the milkfat-oil fluid comprises a weight/weight concentration of a vegetable oil within a range of between about 5% and about 27%; and the yogurt-cheese-oil product comprises a weight/weight concentration of a vegetable oil within a range of between about 4% and about 20%. In a further embodiment, the milkfat-oil fluid comprises a weight/weight concentration of a vegetable oil within a range of between about 8% and about 11%; and the yogurt-cheese-oil product comprises a weight/weight concentration of a vegetable oil within a range of between about 6% and about 8%.

In one embodiment according to the present invention, the milkfat fluid has a butterfat content within a range of between about 10% and about 52% by weight. In a further embodiment according to the present invention, the milkfat fluid has a butterfat content within a range of between about 34.5% and about 52% by weight. In another embodiment according to the present invention, the milkfat fluid has a butterfat content within a range of between about 33% and about 50% by weight. In a further embodiment according to the present invention, the milkfat fluid has a butterfat content within a range of between about 39% and about 50% by weight. In another embodiment according to the present invention, the milkfat fluid has a butterfat content within a range of between about 40% and about 44% by weight. In yet another embodiment according to the present invention, the milkfat fluid has a butterfat content within a range of between about 17% and about 33% by weight. Although much of the ensuing discussion is addressed to embodiments according to the present invention for preparation of a yogurt-cheese-oil product having a butterfat content within a range of between about 33% and about 50% by weight, it will be understood that the teachings according to the present invention may be applied to making products having a butterfat content within any of the other ranges defined above. The term yogurt-cheese-oil product as used herein therefore generally refers broadly to all of such products.

In an additional embodiment according to the present invention, the milkfat fluid has a water content within a range of between about 50% and about 60% by weight. For example, heavy cream may have a butterfat content of about 37% by weight, a protein content of about 2% by weight, and a water content of about 58% by weight, with the balance made up by other milk solids. Butterfat is an essential ingredient in cheese, as the butterfat is coagulated together with proteins and other elements into a curd and further processed to produce the cheese. The term "cheese" is broadly defined for purposes of this disclosure as a milkfat fluid that has been at least partially digested by culture bacteria.

In a further embodiment according to the present invention, the milkfat-oil fluid is pasteurized at step 130. Prior to this step, the milkfat-oil fluid typically carries the wild bacteria load normally present in raw milk products. Pasteurization of the milkfat-oil fluid is required at some point in order to kill these undesirable bacteria, as well as other undesired microbes, to the extent reasonably feasible. Furthermore, if the milkfat-oil fluid is to be subjected to culture bacteria in steps 140-145 or steps 175-180 discussed below, pasteurization needs to be completed in advance of those steps or the wild bacteria in the raw milkfat-oil fluid will typically digest and thereby spoil the product. Where a source of pre-pasteurized milkfat fluid is employed, further pasteurization at this point may be unnecessary.

Pasteurization causes irreversible heat-induced denaturation and deactivation of bacteria. Effective pasteurization is a function of both time and temperature; pasteurization can be completed at higher temperatures in correspondingly shorter times. In one embodiment according to the present invention, pasteurization of the milkfat-oil fluid in step 130 is carried out in a vat process at a temperature of about 150° Fahrenheit ("F") for about 30 minutes; or about 165° F. for about 15 minutes; or if a more strenuous process is desired, about 170° F. for about 30 minutes. Other effective time and temperature treatment parameters are known; and substitution of high surface area contact methods for the vat process can permit shorter effective treatment times. High temperature short time pasteurization for example, in which the milkfat-oil fluid is pumped through an in-line tube within a temperature-controlled shell, can be used. Milkfat fluids having relatively high butterfat content generally require more heat exposure than low butterfat fluids in order to obtain effective pasteurization. Further background information on pasteurization of milk is provided in the Grade "A" Pasteurized Milk Ordinance published on May 15, 2002 by the U.S. Food & Drug Administration, particularly at pages 62 and 63; the entirety of which is hereby incorporated herein by reference.

Agitation is preferably provided and initiated prior to the heating process during pasteurization to facilitate even heating throughout the milkfat-oil fluid and to avoid localized overheating. The force applied by the agitation should not be so strong as to substantially shear and thus degrade the proteins, butterfat, and oil in the milkfat-oil fluid. Desirably, pasteurization is carried out in a tank equipped with a heater and agitator. Any suitable vessel can be used, such as, for example, a Groen kettle.

In an alternative embodiment, the oil is added to the milkfat fluid at a later point in the process shown in FIG. 1. This addition is desirably completed prior to initiation of homogenization in step 185, discussed below, to ensure that the resulting product has a uniform texture.

According to one embodiment of the present invention, the temperature of the milkfat-oil fluid is adjusted at step 135 to a bacteria culture temperature. In another embodiment according to the present invention, the temperature of the milkfat-oil fluid is adjusted to within a range of between about 65° F. and about 92° F. In an additional embodiment according to the present invention, the temperature of the milkfat-oil fluid is adjusted to within a range of between about 70° F. and about 85° F. In yet a further embodiment according to the present invention, the temperature of the milkfat-oil fluid is adjusted to about 82° F.

In one embodiment according to the present invention, culture bacteria are added to the milkfat-oil fluid at step 140, and then cultured at step 145. The purpose of these steps is to generate robust culture-induced flavor in the milkfat-oil fluid. Milk contains lactose sugars that can be digested by selected bacteria, producing lactic acid, glucose and galactose as metabolites. Hence, the culture bacteria generally are selected from among those that can digest lactose. Preferably, a strain of mesophilic bacteria suitable for culturing cheese is used. Such bacteria strains are typically chosen to produce diacetyl flavor. Bacteria strains may require ongoing rotational use, to prevent background bacteriophage populations from becoming resistant to a particular strain of bacteria, which can result in shutdown of the culture process and contamination of the product in production. For example, the culture bacteria may be selected from varying combinations of strains, preferably rotated on an ongoing basis, of (1) lactic acid—producing *Lactococcus lactis* subspecies *lactis* or subspecies *cremoris*; and (2) diacetyl flavor—producing *Lactococcus lactis* subspecies *diacetylactis* or *Leuconostoc* strains. Suitable bacteria strains are commercially available under the trade name pHage Control™ from Chr. Hansen, Bøge Allé 10-12, DK-2970 Hørsholm, Denmark. Grades 604 and 608 are particularly effective. These particular bacteria strain blends can be used continuously without rotation, provided that proper sanitation is maintained. Further suitable bacteria strains are commercially available under the trade names Flav Direct™ and DG™ Cultures from Degussa BioActives, 620 Progress Avenue, P.O. Box 1609, Waukesha, Wis. 53187-1609.

Once a culture bacteria strain or strain mixture is selected, an amount is added to a given batch of milkfat-oil fluid that is effective to propagate live cultures throughout the batch in a reasonable time at the chosen culture temperature. For example, 500 grams of bacteria may be effective to inoculate up to 7,500 pounds of milkfat fluid using an inoculation proportion of about 0.015%. If desired, an inoculation proportion within the range of between about 0.013% and about 0.026%, for example, may be used. In general, greater proportional additions of culture bacteria to a milkfat fluid batch will lead to somewhat reduced processing time, but at the expense of increased costs for the bacteria.

In one embodiment according to the present invention, the milkfat-oil fluid is agitated following the addition of the culture bacteria, since the culture bacteria are typically added in a small proportion compared with the milkfat-oil fluid, and hence desirably are dispersed so that they can act throughout the milkfat-oil fluid. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to substantially shear and thus degrade the culture bacteria or the proteins, butterfat and oil in the milkfat-oil fluid. In one embodiment according to the present invention, moderate agitation of the milkfat-oil fluid containing the culture bacteria is continued for between about 10 minutes and about 25 minutes. In another embodiment according to the present invention, moderate agitation is continued for about 15 minutes.

In step 145, the bacteria, if added at step 140, are cultured in the milkfat-oil fluid. In one embodiment according to the present invention, the milkfat-oil fluid is held at a suitable temperature long enough for cultures of the selected bacteria to begin development, resulting in a slight thickening of the milkfat-oil fluid. The necessary duration of such bacteria culturing depends on the level of bacteria activity, the selected culture temperature, the initial bacteria concentration, and the composition of the milkfat-oil fluid. The bacteria digest lactose sugars in the milk. Higher culture temperatures and initial bacteria concentrations generally shorten the culture time needed. The temperature employed, however, must be within a range tolerable to the survival and growth of the selected culture bacteria. In one embodiment according to the present invention, the milkfat-oil fluid is cultured with the selected bacteria for between about 60 minutes and about 90 minutes. A bacteria culture step of such a limited duration generates a mild thickening of the milkfat-oil fluid.

In one embodiment according to the present invention, the butterfat content of the milkfat-oil fluid is standardized at step 150 to a desired level. The butterfat content of the final yogurt-cheese-oil product can then be projected based on the proportion of yogurt to be used, and its butterfat content. For example, cream cheese is defined to include a minimum butterfat content of 33% by weight. Given the variable nature of raw milk, for example, standardization of the butterfat content in a given batch of milkfat-oil fluid may generally be desirable in furtherance of process stability and production of a uniform product. According to one embodiment of the present invention, the butterfat content of the milkfat-oil fluid is adjusted to within a range of between about 33% and about 50% by weight. According to another embodiment of the present invention, the butterfat content of the milkfat-oil fluid is adjusted to within a range of between about 33% and about 36% by weight. According to a further embodiment of the present invention, the butterfat content of the milkfat-oil fluid is adjusted to within a range of between about 33% and about 34% by weight. According to yet another embodiment of the present invention, the butterfat content of the milkfat-oil fluid is adjusted to about 34.5% by weight. According to a further embodiment of the present invention, the butterfat content of the milkfat-oil fluid is adjusted to within a range of between about 17% and about 33% by weight. According to yet a further embodiment of the present invention, the butterfat content of the milkfat-oil fluid is adjusted to within a range of In general, the texture and mouth feel of cheese products improves with higher between about 19% and about 17% by weight.

In general, the texture and mouth feel of cheese products improves with higher butterfat content. Higher butterfat levels also provide better tolerance of the milkfat-oil fluid to processing steps, such as agitation shear that can degrade protein and butterfat molecules. However, higher butterfat levels also lead to correspondingly higher butterfat content in the finished cheese, which is undesirable from a health standpoint. This standardization can alternatively be carried out prior to culturing the bacteria at step 145, but this practice generally is not preferred.

The initial butterfat level present in a given batch of milkfat fluid can be measured, for example, using a standard Babcock test. For background, see Baldwin, R. J., "The Babcock Test," Michigan Agricultural College, Extension Division, Bulletin No. 2, Extension Series, March 1916, pp. 1-11; the entirety of which is herein incorporated by reference. Where the initial butterfat level present in a given batch of milkfat fluid is too high, adjustment can be accomplished by adding a nonfat material such as skim milk. Addition of water is generally ineffective since the water content of the curd directly affects the product texture, and the feasibility of adding water alone to adjust the butterfat level in the final product is accordingly limited. In one embodiment according to the present invention, the butterfat content of a batch of milkfat fluid is downwardly adjusted by addition of an appropriate amount of nonfat dry milk together with adequate water to rehydrate the nonfat dry milk, which has the advantage of not contributing excess water to the batch. In the event that the initial butterfat level present in a given batch of milkfat fluid needs to be upwardly adjusted, this can be accomplished by addition of a material containing a higher concentration of butterfat, such as, for example, cream. The inclusion of an oil in the milkfat-oil fluid also reduces the overall butterfat concentration of the yogurt-cheese-oil product.

According to further embodiments of the present invention, the relative milkfat-oil fluid concentrations of butterfat, milkfat protein, oil, and water are all controlled. As explained above, the butterfat content of the final yogurt-cheese-oil product is selected as desired. For example, cream cheese includes at least about 33% by weight of butterfat. Regarding protein, higher concentrations are generally desirable for nutritional considerations. Regarding oil, desirably a sufficient concentration is included to substantially reduce the butterfat concentration and cholesterol level in the yogurt-cheese-oil product. Water is a secondary ingredient that is necessary to a reasonable degree to facilitate processing, as well as to provide a desirable texture in the product. However, excessive water will not be retained in the curd and hence becomes a processing hindrance and expense, and a disposal issue. In one embodiment according to the present invention, the milkfat-oil fluid comprises: about 34.5% to about 52% butterfat, about 8% to about 2% oil, about 3% to about 7% milk protein, and about 51.5% to about 36% water, with the balance constituted by other milk solids.

Referring to FIG. 1, a stabilizer is desirably added to the milkfat-oil fluid at step 155. Stabilizers thicken the milkfat-oil fluid by binding water, which may contribute to retention of whey in the milkfat-oil fluid during subsequent processing. Step 155 is preferably carried out after completion of any bacteria culture in steps 135-145 and after completion of any standardization of the butterfat level at step 150; but can be carried out if desired at an earlier stage in phase I as generally indicated at 110. Step 155 can also be carried out if desired at a later stage in the process shown in FIG. 1. However, step 155 is preferably completed prior to homogenization step 185 discussed further below, so that any lumpy texture in the product resulting from stabilizer addition is corrected during homogenization.

The stabilizer may be selected from, for example, gums, salts, emulsifiers, and their mixtures. Suitable gums include, for example, locust bean gum, xanthan gum, guar gum, gum arabic, and carageenan. Suitable salts include, for example, sodium chloride and potassium chloride. These salts can also be added in suitable concentrations, if desired, as flavoring for the yogurt-cheese-oil product. Suitable emulsifiers include, for example, sodium citrate, potassium citrate, mono-, di-, and tri-sodium phosphate, sodium aluminum phosphate, sodium tripolyphosphate, sodium hexametaphosphate, dipotassium phosphate, and sodium acid pyrophosphate. In one embodiment according to the present invention, the stabilizer is K6B493, a milled, dry product that is commercially available from CP Kelco US, Inc., 1313 North Market Street, Wilmington, Del. 19894-0001. In another embodiment according to the present invention, the stabilizer is a distilled glyceride produced by the distillation of mono-glycerides produced from esterification between a triglyceride with glycerol. Variations are obtained through the choice of triglycerides and the concentration of monoglyceride. Suitable distilled glycerides are available from Danisco USA Inc., under the trade name, DIMODAN®. Gum arabic is commercially available from TIC Gums Inc., Belcamp, Md. A stabilizer blend comprising xanthan gum, locust bean gum and guar gum is also commercially available from TIC Gums Inc. Gum—based stabilizers typically contain sodium, which should be taken into account in order to avoid excessive sodium concentrations in the final yogurt-cheese-oil product. For this reason, use of salts as stabilizers is also not preferred. However, the incorporation of a significant proportion of yogurt into the final product reduces the proportional sodium content, as yogurt typically has a low sodium concentration.

Preferably, an amount of a stabilizer effective to cause a moderate thickening of the milkfat-oil fluid is added. For example, a stabilizer may be added in an amount constituting between about 0.2% by weight to about 0.5% by weight of the yogurt-cheese-oil product. In another embodiment, a stabilizer may be added in an amount constituting about 0.45% by weight of the yogurt-cheese-oil product. As the butterfat content of the chosen milkfat-oil fluid is reduced, the proportion of stabilizer used preferably is increased.

In one embodiment according to the present invention, bacteria culture step 145 is terminated by initiating pasteurization at step 160 before substantial thickening of the milkfat-oil fluid occurs. In general, pasteurization step 160 is carried out in the same manner as discussed above in connection with step 130. Limiting bacteria culture step 145 to a mild thickening of the milkfat-oil fluid according to this embodiment of the present invention is a fundamental and major departure from normal production, for example, of cream cheese, in which bacteria culture is typically permitted to run its course until the pH of the milkfat-oil fluid is reduced to within a range between about 5.0 and about 4.1. In the case of such a mild bacteria culture step, there may be very little change in the pH of the milkfat-oil fluid. In one embodiment according to the present invention, the temperature of the milkfat-oil fluid is gradually raised during processing in phase I, so that the temperature continues to rise after completion of bacteria culture in step 145. Hence, pasteurization is initiated in due course when the milkfat-oil fluid reaches an effective pasteurization temperature.

In an alternative embodiment according to the present invention, the bacteria added to the milkfat-oil fluid at step 140 may be cultured for a sufficient time to partially or substantially digest the milkfat-oil fluid, as limited by the attendant pH reduction. Lactic acid is formed as a byproduct of metabolism of lactose by the bacteria in step 145. Hence, the measured pH of the milkfat-oil fluid, which gradually decreases with lactic acid buildup, is an indication of the progress of the bacteria culture. If it is desired, for example, to substantially digest the milkfat-oil fluid, then the bacteria culture step 145 may be continued until the pH of the milkfat-oil fluid is within a range of about 5.0 to about 4.1, or within a range of about 4.6 to about 4.4, at either of which points the bacteria activity becomes substantially dormant.

In one embodiment according to the present invention, the resulting cheese-oil precursor 105 is then cooled at step 165 to a suitable temperature for subsequent combination of the cheese-oil precursor with yogurt in step 170. Once the pasteurization or the milkfat-oil fluid is completed, it is generally desirable to promptly lower the temperature of the resulting cheese-oil precursor 105 to a more moderate level in order to reduce ongoing heat damage to the butterfat, oil and milk proteins. In addition, it may be desired to downwardly adjust the temperature of the cheese-oil precursor 105 so as not to unduly shock or kill the beneficial bacteria present in the yogurt during combination of the yogurt with the cheese-oil precursor, as will be discussed further below in connection with step 170. The high temperatures necessary for pasteurization cannot then be maintained, because they will kill the beneficial yogurt bacteria.

More broadly, the cheese-oil precursor 105 is desirably cooled to a temperature that will facilitate reaching an appropriate temperature for carrying out phase II. In one embodiment according to the present invention, the cheese-oil precursor 105 is cooled to a temperature within a range of between about 110° F. and about 128° F. In another embodiment according to the present invention, the cheese-oil precursor 105 is cooled to a temperature within a range of between about 115° F. and about 128° F. In a further embodiment according to the present invention, the cheese-oil precursor 105 is cooled to a temperature within a range of between about 120° F. and about 125° F. In an additional embodiment according to the present invention, the cheese-oil precursor 105 is cooled to a temperature of about 125° F. If, alternatively, the cheese-oil precursor 105 will be stored prior to further processing, then it is preferably cooled to a refrigeration temperature such as, for example, a temperature within a range of between about 34° F. and about 38° F.

The resulting cheese-oil precursor 105 is then ready for further processing to prepare the yogurt-cheese-oil product 120 according to phase II generally indicated at 115 in FIG. 1. This cheese-oil precursor 105 is a uniform, fluid material containing the butterfat and whey from the milkfat fluid, and an oil. The cheese-oil precursor 105 is characterized by substantially reduced bacterial activity due to its pasteurization. The preparation of the cheese-oil precursor 105 does not require and preferably does not include homogenization or acidification at any point in phase I generally indicated at 110, which are steps normally included in preparation, for example, of cream cheese, although these steps can be undertaken if desired. Acidification in phase I, for example, would cause the curd and whey to separate, defeating the goal of including the whey from the milkfat fluid in the final yogurt-cheese-oil product. Homogenization, for example, is wholly unnecessary in phase I of the production of the yogurt-cheese-oil product. Homogenization at this point would subject the cheese-oil precursor 105 to unnecessary processing that would needlessly increase the processing time and costs, while not substantially contributing to the quality of the final yogurt-cheese-oil product.

The cheese-oil precursor 105 produced according to the process of the present invention is not, for example, cream cheese. Substitution of, for example, cream cheese for the cheese-oil precursor 105 as an ingredient in step 170 to be discussed below defeats the desirable goal of providing a cheese product having retained whey, because whey is separated from the curd in conventional cream cheese production. Moreover, cream cheese and yogurt cannot be directly combined in mutually substantial proportions to yield a homogenous single phase product. Substitution of other conventional cheeses for the cheese-oil precursor similarly defeats the desirable goal of providing a cheese product having retained whey.

Although the process according to the present invention does not produce conventional cheese, nevertheless conventional cheese such as cream cheese can if desired be an ingredient in the yogurt-cheese-oil product. For example, conventional cream cheese can, if desired, be added to the cheese-oil precursor 105 in any desired proportion. As the proportion of conventional cheese in the final yogurt-cheese-oil product increases, the benefits of the teachings according to the present invention are achieved to a correspondingly reduced degree.

Referring to FIG. 1, the cheese-oil precursor 105 and a source of yogurt are then combined at step 170 to produce a combined yogurt-cheese-oil precursor. In general, any yogurt may be used. Yogurt is broadly defined as a milkfat fluid that is cultured by at least one bacteria strain that is suitable for production of yogurt. In one embodiment according to the present invention, the yogurt comprises: about 0% to about 3.25% butterfat, about 3% to about 6% milk protein, and about 76% to about 88% water. In another embodiment according to the present invention, the yogurt comprises: about 0.5% to about 3.25% butterfat, about 3.47% to about 5.25% milk protein, and about 76% to about 88% water. In yet a further embodiment according to the present invention, the yogurt comprises: about 0.5% to about 2.0% butterfat, about 5% milk protein, and about 85% water. In still another embodiment according to the present invention, the yogurt comprises about 0.16% butterfat, about 5.12% milk protein, and about 76% water. In general, any of the foregoing yogurts will have a total solids content of at least about 8% by weight.

Figure 2:
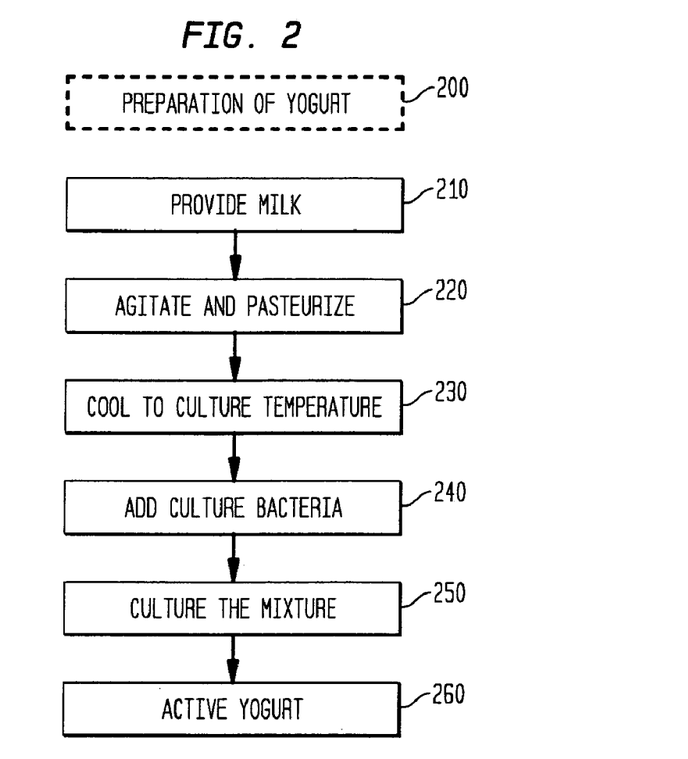
FIG. 2 is a flow chart of an exemplary process for making yogurt for incorporation as an ingredient in the process according to FIG. 1.

In one embodiment according to the present invention, suitable yogurt 260 is prepared according to the exemplary process 200 shown in FIG. 2. Referring to FIG. 2, milk is provided at step 210. The milk employed to produce the yogurt 260 can be, for example, whole milk, reduced fat milk, or skim milk. Butterfat present in the milk facilitates processing because butterfat contributes to the feasibility of thickening the final product to a desirable consistency. However, butterfat present in the milk used in producing the yogurt 260 also results in a higher butterfat concentration in the final yogurt-cheese-oil product. In one embodiment according to the present invention, the milk employed to produce the yogurt 260 accordingly is skim milk. In another embodiment according to the present invention, the butterfat content of the milk is less than 1% by weight. In any case, the selected milk can be directly sourced from liquid milk such as cow milk, or it can be reconstituted from dry milk.

In a further embodiment according to the present invention, the solids level of the milk to be used in preparing the yogurt 260 is standardized to within a range of between about 18% and about 22% by weight. In another embodiment according to the present invention, the solids level of the milk is standardized to about 22% by weight. If the solids level of the milk is substantially in excess of 22% by weight, the bacteria culture used to produce the yogurt 260 may digest the milk too slowly for practical production of yogurt. However, if a particularly robust bacteria strain is used, or if the milk is inoculated with an extra high bacteria load, use of milk with higher solids content may be feasible. Alternatively, the solids level of the milk can be standardized to within a range of between about 10% and about 12% by weight, as is employed in conventional preparation of yogurt. However, such a relatively low solids level can hinder production of a final yogurt-cheese-oil product having a desirably thick texture. The solids content of the milk provided at step 210 can be increased if desired by any process suitable to yield a condensed milk. Condensation processes that do not involve heating the milk, such as ultrafiltration, are preferred in order to reduce processing damage of the milk.

At step 220, the milk is pasteurized. Pasteurization should generally be carried out as earlier discussed, for example, at a temperature of at least about 165° F. for at least about 15 minutes. In one embodiment according to the present invention, pasteurization of the milk is carried out at a temperature of about 170° F. for about 30 minutes. Agitation should be provided to facilitate even heating of the milk and to avoid localized overheating.

At step 230, the milk is then cooled to a bacteria culture temperature. Once the pasteurization of the milk is completed, it is generally desirable to promptly lower the temperature of the milk to a more moderate level in order to reduce ongoing heat damage. In addition, bacteria will be cultured in the milk at steps 240-250, as will be discussed further below. As pointed out above, the high temperatures necessary for pasteurization cannot persist when the culture bacteria are added at step 240. In one embodiment according to the present invention, the milk is cooled at step 230 to a temperature within a range of between about 90° F. and about 115° F. In another embodiment according to the present invention, the milk is cooled at step 230 to a temperature within a range of between about 106° F. and about 110° F. In yet a further embodiment according to the present invention, the milk is cooled at step 230 to a temperature of about 108° F.

At step 240, culture bacteria are added to the milk. Since yogurt 260 is the desired product of the process in FIG. 2, bacteria strains that are suitable for production of yogurt are used. For example, *Lactobacillus delbrueckii* subspecies *bulgaricus*, *Streptococcus thermophilus*, *Lactobacillus acidophilus*, *Bifidobacterium*, and *Lactobacillus paracasei* subspecies *casei* can be used. If available, other lactic acid—producing bacteria strains suitable for making yogurt can be used. Suitable yogurt culture bacteria strains are commercially available under the trade name Yo-Fast® from Chr. Hansen, Bøge Allé 10-12, DK-2970 Hørsholm, Denmark. In one embodiment according to the present invention, F-DVS YoFast®-10 is used, which contains blended strains of *Streptococcus thermophilus*, *Lactobacillus delbrueckii* subspecies *bulgaricus*, *Lactobacillus acidophilus*, *Bifidobacterium*, and *Lactobacillus paracasei* subspecies *casei*. In another embodiment according to the present invention, DVS YoFast®-2211 is used.

In a further embodiment according to the present invention, a yogurt culture comprising *Lactobacillus acidophilus*, *Bifidobacterium*, and *L. casei* is used. For example, Yo-Fast® 20 cultures comprise mixtures of *Lactobacillus acidophilus*, *Bifidobacterium*, and *L. casei*. Such yogurt cultures can develop a very mild flavor and have high texturing properties, making possible the reduction or elimination of stabilizers and additives that may otherwise be needed for increasing the product thickness. These yogurt cultures require minimal post-acidification, resulting in longer product shelf life. Such yogurt cultures also lend a desirable mouth feel and creaminess to low-fat products.

Further suitable bacteria strains are commercially available under the trade names Ultra-Gro® and Sbifidus® from Degussa BioActives, 620 Progress Avenue, P.O. Box 1609, Waukesha, Wis. 53187-1609.

Once a culture bacteria strain is selected, an amount is added to the milk that is effective to propagate live cultures throughout a given batch of milk in a reasonable time at the chosen culture temperature. In general, greater proportional additions of culture bacteria to a milk batch will reduce processing time, but at the expense of increased costs for the bacteria.

In one embodiment according to the present invention, the milk is agitated following the addition of the culture bacteria, since the culture bacteria are typically added in a small proportion compared with the milk, and desirably are dispersed so that they can act throughout the milk. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to shear and thus degrade the culture bacteria or the proteins and butterfat in the milk. In one embodiment according to the present invention, moderate agitation of the milk containing the culture bacteria is continued for between about 10 minutes and about 25 minutes. In another embodiment according to the present invention, moderate agitation is continued for about 15 minutes.

In step 250, the bacteria added at step 240 are cultured in the milk. The milk is held at a suitable temperature for cultures of the selected bacteria to develop for a sufficient time so that there is visible curd formation throughout the milk, resulting in a substantial thickening. In one embodiment according to the present invention, the milk is held at a temperature within a range of between about 95° F. and about 112° F. In another embodiment according to the present invention, the milk is held at a temperature within a range of between about 100° F. and about 110° F. In a further embodiment according to the present invention, the milk is held at a temperature within a range of between about 106° F. and about 110° F. In an additional embodiment according to the present invention, the milk is held at a temperature of about 108° F. The necessary duration of the bacteria culturing depends on the level of bacteria activity, the selected culture temperature, the initial bacteria concentration, and the composition of the milk. In one embodiment according to the present invention, the milk is cultured with the selected bacteria for between about 4 hours and about 6 hours. In another embodiment according to the present invention, the milk is cultured with the selected bacteria at a temperature of about 108° F. for about 6 hours.

Lactic acid is formed as a byproduct of metabolism of lactose by the bacteria in step 250. Hence, the measured pH of the milk, which gradually decreases with lactic acid buildup, is an indication of the progress of the bacteria culture. Further, when the pH of the milk reaches about 4.4, the level of bacterial activity begins to markedly decrease. In one embodiment according to the present invention, the bacteria culture step 250 is continued until the pH of the milk is within a range of about 5.0 to about 4.1. In another embodiment according to the present invention, the bacteria culture step 250 is continued until the pH of the milk is within a range of about 4.6 to about 4.4; and more preferably about 4.5.

When the bacteria culture step 250 is complete, the resulting product is yogurt 260 containing live bacteria cultures. Preferably, the yogurt has a uniform consistency with a solids content of at least about 8%.

Returning to FIG. 1, phase II begins with combining the cheese-oil precursor 105 and a yogurt source together at step 170 to yield a combined yogurt-cheese-oil precursor. Yogurt 260 and the cheese-oil precursor 105 desirably are simultaneously prepared so that phase II of FIG. 1 as generally indicated at 115 can then immediately be carried out. In this manner, the active yogurt 260 is already at a suitable temperature, as discussed above, for combination with the cheese-oil precursor 105 at step 170; and the cheese-oil precursor 105 can be cooled at step 165 to that same temperature or to another compatible temperature.

Alternatively, if the yogurt 260 is prepared in advance of undertaking phase II of FIG. 1, then the yogurt desirably is cooled in the meantime to a refrigeration temperature such as, for example, within a range of between about 34° F. and about 38° F., to retard unwanted continuation of bacterial activity, and is then reheated. In one embodiment according to the present invention, the yogurt 260 is reheated to a temperature within a range of between about 95° F. and about 112° F. In another embodiment according to the present invention, the yogurt 260 is reheated to a temperature within a range of between about 100° F. and about 110° F. In a further embodiment according to the present invention, the yogurt 260 is reheated to a temperature within a range of between about 106° F. and about 110° F. In an additional embodiment according to the present invention, the yogurt 260 is reheated to a temperature of about 108° F. However, the necessary heat cycling in such reheating causes degradation of the yogurt, including precipitation of the curd and attendant syneresis, and including a reduction in the live yogurt bacteria concentration. Accordingly, reheating desirably is avoided.

In one embodiment according to the present invention, the cheese-oil precursor 105 and yogurt 260 are combined together at step 170 of FIG. 1 at selected temperatures, in selected proportions, and in a selected manner.

Ambient air contains harmful bacteria that can degrade the cheese-oil precursor 105 and the yogurt 260. Accordingly, exposure of these ingredients during and after their preparation to air, as well as air exposure of the resulting combined yogurt-cheese-oil precursor and the completed yogurt-cheese-oil product, desirably are minimized.

Assuming that the above-discussed preparations of the cheese-oil precursor 105 and yogurt 260 have been simultaneously completed, the respective temperatures of these ingredients are preferably controlled with attention to preserving live culture bacteria in the yogurt, to minimizing further heating and cooling operations, and to preventing shock to or death of the live yogurt culture bacteria. Live yogurt bacteria cultures themselves provide well-known health benefits to the consumer, and accordingly are preferably included in the final yogurt-cheese-oil product. If either of the cheese-oil precursor 105 and yogurt 260 ingredients to be so used is either too hot or too cold, its temperature can be adjusted. In one embodiment according to the present invention, the temperatures of the cheese-oil precursor 105 and the yogurt 260 are adjusted before combining them together to within a range of between about 110° F. and about 128° F., and to within a range of between about 95° F. and about 112° F., respectively. In a further embodiment according to the present invention, the temperatures of the cheese-oil precursor 105 and the yogurt 260 are adjusted before combining them together to within a range of between about 115° F. and about 128° F., and to within a range of between about 100° F. and about 110° F., respectively. In another embodiment according to the present invention, the temperatures of the cheese-oil precursor 105 and the yogurt 260 are adjusted before combining them together to within a range of between about 120° F. and about 125° F., and to within a range of between about 100° F. and about 108° F., respectively. In an additional embodiment according to the present invention, the temperatures of the cheese-oil precursor 105 and the yogurt 260 are adjusted before combining them together to temperatures of about 125° F. and about 108° F., respectively.

The proportions of cheese-oil precursor 105 and yogurt 260 to be combined at step 170 are a matter of discretion. However, the cheese-oil precursor 105 typically contains a relatively higher concentration of butterfat, and the yogurt 260 typically contains a relatively lower concentration of butterfat, cholesterol and sodium, and a relatively higher concentration of milk protein. Further, a substantial proportional addition of yogurt 260 to the cheese-oil precursor 105 contributes the robust flavor, reduced cholesterol, and healthful active bacteria cultures of yogurt to the overall product. Hence, according to one embodiment of the present invention a sufficient proportion of yogurt 260 is used relative to a given batch of cheese-oil precursor 105, to yield a desired substantial improvement in the flavor and a desired substantial influence of the beneficial constituents in the yogurt on their mixture relative to that in the cheese-oil precursor.

According to another embodiment of the present invention, the mixture of cheese-oil precursor 105 and yogurt 260 is controlled to comprise between about 10% and about 50% by weight of yogurt. In an additional embodiment according to the present invention, the mixture of cheese-oil precursor 105 and yogurt 260 is controlled to comprise between about 25% and about 40% by weight of yogurt. According to a further embodiment of the present invention, the mixture of cheese-oil precursor 105 and yogurt 260 is controlled to comprise between about 25% and about 35% by weight of yogurt. According to an additional embodiment of the present invention, the mixture of cheese-oil precursor 105 and yogurt 260 is controlled to comprise about 30% by weight of yogurt. Where flavorings are to be added to the yogurt-cheese-oil product, slightly lower proportions of yogurt generally are preferred, for example about 24% to about 28% by weight of yogurt, and more preferably about 26% by weight of yogurt.

The cheese-oil precursor 105 and the yogurt 260 are combined together at step 170. Desirably, this combination step is carried out within a reasonable time following completion of the preparation of the cheese-oil precursor 105 in phase I shown in FIG. 1, and within a reasonable time following completion of the preparation of the yogurt 260 as shown in FIG. 2. However, provided that excessive bacterial activity or heat-induced degradation is not permitted to take place in either of these ingredients over an extended time period before they are combined together, the cheese-oil precursor 105 and the yogurt 260 can be separately stored as desired prior to carrying out step 170.

Where the relative proportion of yogurt 260 is small compared to the proportion of cheese-oil precursor 105, it is generally easier to combine the minor yogurt ingredient into the major cheese-oil precursor ingredient. In general, the cheese-oil precursor 105 and the yogurt 260 are combined with moderate agitation for a time sufficient to thoroughly mix them together. Care should again be taken to minimize shearing of milk proteins, butterfat, oil, and the live culture bacteria. In one embodiment according to the present invention, the combined yogurt-cheese-oil precursor resulting from combination of the cheese-oil precursor 105 and the yogurt 260 is then maintained at a temperature within a range of between about 118° F. and about 125° F. In another embodiment according to the present invention, the combined yogurt-cheese-oil precursor resulting from combination of the cheese-oil precursor 105 and the yogurt 260 is then maintained at a temperature within a range of between about 118° F. and about 120° F.

Desirably, the cheese-oil precursor 105 and yogurt 260 are thoroughly mixed before reaching homogenization at step 185 discussed below. This mixing can be carried out in a vessel provided with an agitator, separate from the vessel in which the homogenization occurs. Such thorough mixing prior to homogenization can result in a more uniform consistency in the final yogurt-cheese-oil products. Such a vessel can be provided with internal or external heating and cooling exchangers in order to adjust or control the temperature of the combined yogurt-cheese-oil precursor to a desired temperature as further discussed below. In one exemplary embodiment, this mixing is carried out for a period of time within a range of between about 10 minutes and about 30 minutes. In another exemplary embodiment, this mixing is carried out for a period of about 15 minutes.

At step 185, the combined yogurt-cheese-oil precursor is homogenized by subjecting it to an elevated pressure, desirably at an elevated temperature, for a suitable period of time. Application of such an elevated pressure breaks down the butterfat globules in the combined yogurt-cheese-oil precursor, resulting in substantially increased product uniformity. In general, homogenization is carried out at an elevated pressure, which can be applied to the combined yogurt-cheese-oil precursor by any suitable means, such as, for example, hydraulic or mechanical force. In one embodiment according to the present invention, the combined yogurt-cheese-oil precursor is compressed to the selected pressure and then passed through an orifice to quickly reduce such pressure. Homogenization is desirably carried out at a relatively high temperature, because the resulting fluidity of the combined yogurt-cheese-oil precursor increases the efficiency of the homogenization step. However, at a temperature greater than about 128° F. the desirable yogurt bacteria generally cannot survive, and temperatures above about 125° F. result in gradual bacteria death. Accordingly, in one embodiment according to the present invention, the homogenization step 185 is carried out at a controlled temperature not in excess of about 125° F. In another embodiment according to the present invention, homogenization is carried out at a controlled temperature within a range of between about 118° F. and about 125° F. In a further embodiment according to the present invention, homogenization is carried out at a controlled temperature within a range of between about 118° F. and about 120° F. Although higher temperatures can be used, desirably a temperature is chosen that will not kill the live culture bacteria in the product. Homogenization can be carried out, for example, in a Gaulin homogenizer.

In one embodiment according to the present invention, the homogenization pressure is within a range of between about 2,000 pounds per square inch (PSI) to about 4,000 PSI. In another embodiment according to the present invention, the homogenization pressure is within a range of between about 2,500 PSI to about 3,200 PSI. As the applied pressure increases, the resulting thickness of the final yogurt-cheese-oil product accordingly increases. Hence, the pressure to be applied is preferably chosen to yield a final product of the desired consistency.

In one embodiment according to the present invention, a homogenizer is employed having a homogenization chamber, an inlet chamber, and an outlet chamber. The inlet chamber is a vessel suitable for staging a supply of the combined yogurt-cheese-oil precursor, on a continuous or batch basis, for introduction into the homogenization chamber. The homogenization chamber is a vessel having controllable orifices for input and output of the combined yogurt-cheese-oil precursor, and is reinforced to withstand containment of an elevated pressure suitable for homogenization. The outlet chamber is a vessel suitable for staging a supply of the homogenized combined yogurt-cheese-oil precursor, on a continuous or batch basis, for further processing. The combined yogurt-cheese-oil precursor passes through the inlet chamber before being pumped into the homogenization chamber. Following homogenization, the combined yogurt-cheese-oil precursor is expelled from the homogenization chamber into the outlet chamber. These flows are typically carried out on a continuous basis, although a batch process can also be done. The pressure within the homogenization chamber is adjusted to the chosen homogenization pressure and maintained there during homogenization. The pressure in the inlet chamber may be, for example, within a range of between about 20 PSI and about 40 PSI, generated by pumping of the combined yogurt-cheese-oil precursor into the inlet chamber. Similarly, the pressure in the outlet chamber may be, for example, within a range of between about 20 PSI and about 40 PSI, generated by expelling the combined yogurt-cheese-oil precursor from the homogenization chamber and then containing it in the outlet chamber. The combined yogurt-cheese-oil precursor can undergo a pressure drop upon passing from the homogenization chamber to the outlet chamber, by ejection through a hole, such as for example a hole having a diameter of about a centimeter. The pressures within the inlet chamber, outlet chamber and homogenization chamber are carefully controlled so that air is not entrained into the homogenization chamber. Such air can cause cavitation, which can degrade the product and potentially lead to an explosive release of the homogenization pressure.

At step 190, the combined yogurt-cheese-oil precursor is acidified to a pH suitable to retard activity of bacteria, and to complete the coagulation of the combined yogurt-cheese-oil precursor to yield the yogurt-cheese-oil product 120. Desirably, acidification is carried out promptly following formation of the combined yogurt-cheese-oil precursor at step 170. In one embodiment according to the present invention, acidification is completed within less than about three (3) hours following preparation of the combined yogurt-cheese-oil precursor at step 170. In another embodiment according to the present invention, acidification is completed within less than about two (2) hours following preparation of the combined yogurt-cheese-oil precursor at step 170. In a further embodiment according to the present invention, acidification is completed within less than about thirty (30) minutes following preparation of the combined yogurt-cheese-oil precursor at step 170. Where acidification is delayed substantially beyond three hours following preparation of the combined yogurt-cheese-oil precursor at step 170, the thickness of the final yogurt-cheese-oil product tends to be correspondingly reduced, and the consistency of the product tends to break down with attendant syneresis. While not wishing to be bound by theory, it is believed that excessive bacterial activity in the combined yogurt-cheese-oil precursor is a substantial contributing cause of these adverse effects.

In one embodiment according to the present invention, a first point in time T1 when the cheese-oil precursor 105 and the yogurt 260 are combined together at step 170 to produce the combined yogurt-cheese-oil precursor, and a second point in time T2 when the combined yogurt-cheese-oil precursor is acidified at step 190, are both monitored and controlled. In a further embodiment according to the present invention, T2 is within about three (3) hours or less following T1. In an additional embodiment according to the present invention, T2 is within about two (2) hours or less following T1. In another embodiment according to the present invention, T2 is within about thirty (30) minutes or less following T1.

In an additional embodiment according to the present invention, a first point in time T1 when the cheese-oil precursor 105 and the yogurt 260 are combined together at step 170 to produce a batch of the combined yogurt-cheese-oil precursor, and a second point in time T2 when the batch of combined yogurt-cheese-oil precursor is acidified at step 190, are both monitored and controlled. In a further embodiment according to the present invention, T2 is within about three (3) hours or less following T1. In another embodiment according to the present invention, T2 is within about two (2) hours or less following T1. In an additional embodiment according to the present invention, T2 is within about thirty (30) minutes or less following T1.

In the preceding embodiments wherein the first and second points in time T1 and T2 are monitored and controlled, the time delay is managed between the point in time of production of a given portion of combined yogurt-cheese-oil precursor and the point in time of acidification of that same portion. By "monitored" is meant that the first and second points in time T1 and T2 are registered in a suitable manner, which may for example be automated or manual. By "controlled" is meant that the time delay between the first and second points in time T1 and T2 is regulated in a suitable manner, which may for example be automated or manual. In this manner, the yogurt-cheese-oil product generated from a particular portion of combined yogurt-cheese-oil precursor will have a desirable thickness and shelf life. In a continuous production operation, the yogurt-cheese-oil product output from the process shown in FIG. 1 will be of a consistently satisfactory quality, without pockets of thin consistency or of propensity to accelerated spoilage. In a batch production operation, the entire batch will be of such satisfactory quality, rather than resulting in pockets of poor quality product or in sub-batches of varying quality. For example, a large batch of combined yogurt-cheese-oil precursor which is further processed as a series of sub-batches will not be acidified over a time delay period in excess of about three hours, thus preventing the generation of sub-batches of declining quality as the delay increases.

Although the cheese-oil precursor 105 is pasteurized at step 160, the yogurt 260 typically contains live bacteria cultures and becomes the mother culture for the combined yogurt-cheese-oil precursor. Accordingly, it is expected that other measures for retarding the bacterial activity in the combined yogurt-cheese-oil precursor can be carried out alternatively to or in conjunction with timed acidification. In one embodiment according to the present invention, homogenization and acidification are carried out on a substantially simultaneous basis in order to minimize the time to completion of these steps. The optimum temperature zone for rapid bacterial growth is generally within a range of between about 75° F. and about 115° F. Accordingly, the combined yogurt-cheese-oil precursor and the resulting yogurt-cheese-oil product are desirably exposed to temperatures within this range for as short a time period as reasonably possible in order to minimize undesirable and excessive bacterial activity and spoilage in the product. Hence, in one embodiment according to the present invention, the temperature of the combined yogurt-cheese-oil precursor is rapidly reduced to retard bacterial activity at a time following completion of step 170, and subsequent steps in the process for making the yogurt-cheese-oil product are then carried out at such a reduced temperature or temperatures in order to minimize the cumulative bacterial activity on the combined yogurt-cheese-oil precursor during the balance of phase II. In a further embodiment according to the present invention, such temperature reduction is carried out at a time following completion of step 170, but the temperature of the combined yogurt-cheese-oil precursor is subsequently raised to optimize homogenization in step 185 as discussed above and then is reduced again to retard bacterial activity. These embodiments may permit the completion of acidification step 190 to be delayed for up to about seven (7) hours following preparation of the combined yogurt-cheese-oil precursor at step 170.

In one embodiment according to the present invention, acidification step 190 is carried out in the outlet chamber of the homogenizer discussed above, desirably adjacent to the homogenization chamber. In this manner, step 190 can be carried out as soon as homogenization in step 185 is completed, typically on a continuous basis. The outlet chamber can comprise, for example, a set tank internally equipped with a scraped surface agitator to ensure rapid and thorough mixing of added acid with the homogenized combined yogurt-cheese-oil precursor. Agitation desirably is discontinued upon reaching the desired product pH, in order to avoid excessive shearing and possible resulting breakdown of the texture of the yogurt-cheese-oil product. Acidification can generally be carried out at the same temperature range or temperature employed for homogenization. For example, acidification can be carried out at a temperature of about 125° F. If desired, acidification can be carried out at a lower temperature than that employed in homogenization step 185, although the thickness increases as the temperature is reduced, and feasibility of mixing the acidification agent into the yogurt-cheese-oil product is also important. In one embodiment according to the present invention, the temperature of the combined yogurt-cheese-oil precursor is reduced at least to a temperature within a range of between about 112° F. and about 114° F. during or after acidification in step 190. In another embodiment according to the present invention, the temperature of the combined yogurt-cheese-oil precursor is reduced to a temperature of less than about 100° F. during or after acidification in step 190. In a further embodiment according to the present invention, the temperature of the combined yogurt-cheese-oil precursor is reduced to a temperature of less than about 75° F. at a point during or after acidification in step 190. Carrying out acidification becomes gradually more difficult as the temperature of the combined yogurt-cheese-oil precursor is lowered, due to the steadily increasing thickness. Furthermore, acidification at a temperature below about 60° F. may result in a lumpy yogurt-cheese-oil product texture. Cooling can be effected, for example, using jacketed tanks containing a glycol refrigerant maintained at a desired temperature to withdraw heat from the combined yogurt-cheese-oil precursor in the tank.

Acidification causes substantial thickening of the combined yogurt-cheese-oil precursor, and may hinder homogenization if acidification is carried out before homogenization. However, the order of homogenization step 185 and acidification step 190 can be inverted so that acidification is carried out first, if desired; or as discussed earlier these steps can be concurrently carried out. For example, acidification step 190 can be carried out in the inlet chamber of a homogenizer, the inlet chamber being equipped with a scraped surface agitator, or can be carried out as part of combining the cheese-oil precursor 105 and yogurt 260 in step 170.

In one embodiment according to the present invention, the pH of the combined yogurt-cheese-oil precursor is adjusted to within a range of about 5.0 to about 4.1, more preferably about 4.6 to about 4.4, and still more preferably about 4.5. In another embodiment according to the present invention, the pH of the combined yogurt-cheese-oil precursor for producing a plain yogurt-cheese-oil product, meaning one that does not contain or contains minimal concentrations of fruits, vegetables, nuts, flavorings, condiments or other food additives, is adjusted to within a range of between about 4.40 and about 4.50. In a further embodiment according to the present invention, the pH of the combined yogurt-cheese-oil precursor for a flavored yogurt-cheese-oil product, meaning one that does contain a significant concentration of fruits, vegetables, nuts, flavorings, condiments or other food additives, is adjusted to within a range of between about 4.38 and about 4.48. At a pH of the combined yogurt-cheese-oil precursor lower than about 4.40 or 4.38 for plain or flavored yogurt-cheese-oil products respectively, the taste begins to become sharp, and at a pH of about 4.7 or lower is generally too tart. At a pH of the combined yogurt-cheese-oil precursor above about 4.50 or 4.48 for plain or flavored yogurt-cheese-oil products respectively, the product thickness begins to undesirably decline, potentially resulting in poor body or runniness.

In one embodiment according to the present invention, the pH adjustment is carried out by adding an appropriate amount of an edible acid to the combined yogurt-cheese-oil precursor. Edible acids include, for example, lactic acid, phosphoric acid, acetic acid, citric acid, and mixtures. For example, a suitable aqueous mixture of edible acids having a pH within a range of between about 0.08 and about 1.4 is available under the trade name Stabilac® 12 Natural from the Sensient Technologies Corporation, 777 East Wisconsin Avenue, Milwaukee, Wis. 53202-5304. Similar edible acid mixtures are also available from Degussa Corporation, 379 Interpace Parkway, P.O. Box 677, Parsippany, N.J. 07054-0677. In another embodiment according to the present invention, the edible acid is lactic acid, being a metabolite naturally produced by the lactose—consuming bacteria that are used in producing the yogurt 260 and the cheese-oil precursor 105.

Since the thickness of the resulting product increases as the pH is reduced, edible acid addition can be used to control the thickness of the final yogurt-cheese-oil product. Furthermore, bacteria present in the final product become substantially dormant at a pH substantially below about 4.38, hence acidification substantially slows down their further propagation in the product, extending its shelf life. However, the desirable yogurt bacteria are not killed by this acidification process, and thus can still provide the health benefits of active yogurt cultures to the consumer. The edible acid present in the final yogurt-cheese-oil product also serves to provide a good-tasting bite to the flavor. At a pH of less than about 4.2, the product not only becomes too tart but may also start to soften, reducing the product thickness.

In an alternative embodiment, a coagulating enzyme can be substituted for or used in conjunction with direct acid addition. Coagulating enzymes cause the casein protein in milk to form a gel. However, the action of coagulating enzymes generally requires much more time to completion than direct acidification, meanwhile allowing far more culture bacteria activity to occur and delaying the completion of acidification. The enzyme coagulation process is also accompanied by syneresis and the resulting loss of albumin protein from the gelled curd. Hence, enzyme coagulation generally results in an inferior product having a reduced thickness and protein content. However, it may be feasible to reincorporate the whey into the combined yogurt-cheese-oil precursor so long as the enzyme coagulation is carried out before homogenization. Enzymatic coagulation typically takes a long time, 12 hours for example. In general, any suitable coagulating enzyme of animal-, plant-, microbe-, or other origin can be used. In one embodiment, the coagulant enzyme is chymosin, also referred to as rennin, which is the active component of rennet. Rennet is purified from calf stomachs. Chymosin breaks down casein protein to paracasein. Paracasein then combines with calcium to form calcium paracaseinate, which precipitates and starts formation of a solid mass. Milkfat and water become incorporated into the mass, forming curds. One part rennin can coagulate about 10,000 to about 15,000 parts milkfat fluid. Alternatively; pepsin, which is purified from the stomachs of grown calves, heifers, or pigs, can be used.

In order to facilitate the time-controlled and rapid completion of acidification in step 190, live bacteria culture desirably is not carried out in the combined yogurt-cheese-oil precursor prior to such acidification. Assuming that the cheese-oil precursor 105 and the yogurt 260 have separately undergone live bacteria culture steps as discussed above, further culture of live bacteria in the combined yogurt-cheese-oil precursor generally provides only marginal further flavor improvement. Moreover, the significant additional processing time required in order to add and culture such bacteria in the combined yogurt-cheese-oil precursor delays the completion of acidification step 190 and cooling of the yogurt-cheese-oil product to a temperature of below about 75° F., which delay can result in lower product thickness and shorter product shelf life.

In alternative embodiments according to the present invention, live culture bacteria may be added to the combined yogurt-cheese-oil precursor in step 175, and then cultured in step 180. If the yogurt 260 employed at step 170 contains live bacteria cultures, then adding further culture bacteria at step 175 may be completely unnecessary and step 175 can thus be omitted. Alternatively, if the selected yogurt 260 does not contain live bacteria cultures, then such cultures may, if desired, be added at step 175. In another embodiment according to the present invention in which the cheese-oil precursor 105 was not subjected to culture of bacteria at step 145, culture by yogurt bacteria may be carried out at this point. In general, culture bacteria can be so added if desired following the guidelines discussed above regarding step 240 of FIG. 2, preferably with agitation. Live yogurt bacteria cultures themselves provide well-known health benefits to the consumer, and accordingly are preferably included in the final yogurt-cheese-oil product. Although the combined yogurt-cheese-oil precursor can also or alternatively be cultured by cream cheese culture bacteria such as may be employed at step 140, such cream cheese bacteria do not typically provide the health benefits that are provided to the consumer by live yogurt bacteria. In a further embodiment according to the present invention, culture bacteria are added to the cheese-oil precursor 105 following pasteurization step 160.

In one embodiment according to the present invention, yogurt bacteria are then cultured in the combined yogurt-cheese-oil precursor at step 180. The combined yogurt-cheese-oil precursor is held at a suitable temperature for cultures of the selected bacteria to develop for a sufficient time so that there is visible curd formation throughout the combined yogurt-cheese-oil precursor, resulting in a substantial thickening and a significant reduction in the pH. In one embodiment according to the present invention, the combined yogurt-cheese-oil precursor is held at a temperature within a range of between about 110° F. and about 120° F. In another embodiment according to the-present invention, the combined yogurt-cheese-oil precursor is held at a temperature of about 108° F. In an additional embodiment according to the present invention, the combined yogurt-cheese-oil precursor is cultured with the selected bacteria for between about 4 hours and about 6 hours. In another embodiment according to the present invention, the combined yogurt-cheese-oil precursor is cultured with the selected bacteria at a temperature of about 108° F. for about 6 hours. In yet a further embodiment according to the present invention, the bacteria culture step 180 is continued until the pH of the combined yogurt-cheese-oil precursor is within a range of about 5.0 to about 4.1, more preferably about 4.6 to about 4.4, and still more preferably about 4.5.

Returning to FIG. 1, following completion of acidification step 190 the temperature of the finished yogurt-cheese-oil product is preferably reduced to a suitable refrigeration temperature, such as, for example, about 34° F. to about 38° F.

If desired, a suitable preservative can be added to the yogurt-cheese-oil product to retard bacteria, yeast and mold growth. For example, potassium sorbate, sodium benzoate, sorbic acid, ascorbic acid or nisin can be added, preferably before acidification step 190 and consequent thickening, to facilitate their dispersion in minor proportion throughout the yogurt-cheese-oil product. Nisin, for example, is a protein expressed by *Lactococcus lactis*. Further, if desired, flavorings, condiments and the like can be added. In one embodiment, a butter flavoring is added to the yogurt-cheese-oil product. Butter flavorings are commercially available from Spice Barn Inc., 499 Village Park Drive, Powell, Ohio 43065; and from Kernel Pops of Minnesota, 3311 West 166$^{th}$ Street, Jordan, Minn. 55352, an affiliate of R.D. Hanson & Associates, Inc. In another embodiment, a suitable coloring is added to the yogurt-cheese-oil product, such as a yellow coloring for example. Beta carotene is a suitable yellow coloring, giving the yogurt-cheese-oil product a buttery appearance. Adjuvants that are vulnerable to attack by the live bacteria are preferably added after reducing the temperature of the yogurt-cheese-oil product below about 75° F., and may need to be made resistant to such bacteria.

In one embodiment, live yogurt culture bacteria are added to the yogurt-cheese-oil product in step 195 following completion of acidification in step 190 and provided that the temperature of the yogurt-cheese-oil product is low enough at and following such addition to avoid killing or unduly shocking the live culture bacteria. Step 195 can be carried out in the same manner as discussed above in connection with step 175. Such live bacteria reinforce the health-related benefits of live and active yogurt culture bacteria in the yogurt-cheese-oil product, as earlier discussed. The need for such live culture bacteria addition and the concentration of such bacteria to be added to a given yogurt-cheese-oil product can be determined by carrying out a bacteria activity test. For example a Man, Rogosa and Sharpe ("MRS") broth test can be carried out.

The yogurt-cheese-oil product made according to the process of the present invention generally has the appearance, consistency, and texture of a cheese or butter product. For example, the texture may be similar to that of cream cheese, or of another soft cheese. Alternatively, for example, the product texture may be similar to that of butter or margarine, in brick or spread form. In addition, this product has the robust, desirable flavor of yogurt. Further, the product includes retained whey from the milkfat fluid, which dramatically amplifies the flavor of the product, giving it a greatly superior and robust taste. Retention of the whey in this manner adds natural flavor without subjecting the product to large proportions of adulterating additives or heavy extra processing steps, and eliminates the pollution and economic loss resulting from whey separation in conventional cheese production. Further, the yogurt-cheese-oil product comprises an oil, which improves the product spreadability, and contributes to the product texture. In addition, the yogurt-cheese-oil product has reduced cholesterol and sodium.

In one embodiment in accordance with the present invention, the yogurt-cheese-oil product comprises between about 10% and about 80% butterfat. In another embodiment in accordance with the present invention, the yogurt-cheese-oil product comprises between about 34.5% and about 52% butterfat. In one embodiment in accordance with the present invention, the yogurt-cheese-oil product comprises between about 33% and about 40% butterfat. In another embodiment in accordance with the present invention, the yogurt-cheese-oil product comprises between about 17% and about 33% butterfat. In a further embodiment in accordance with the present invention, the yogurt-cheese-oil product comprises between about 10% and about 17% butterfat.

Addition of significant proportions of yogurt tends to somewhat reduce the butterfat content of the overall yogurt-cheese-oil product. Thus, in one embodiment according to the present invention, the yogurt-cheese-oil product comprises between about 8% by weight and about 35% by weight of butterfat. In another embodiment according to the present invention, the yogurt-cheese-oil product comprises between about 10% by weight and about 26% by weight of butterfat. In yet another embodiment according to the present invention, the yogurt-cheese-oil product comprises between about 23% by weight and about 26% by weight of butterfat. In yet a further embodiment according to the present invention, the yogurt-cheese-oil product comprises between about 25% by weight and about 26% by weight of butterfat. In yet another embodiment according to the present invention, the yogurt-cheese-oil product further comprises between about 2% by weight and about 14% by weight of milk protein, more preferably between about 3% by weight and about 8% by weight of milk protein, and still more preferably between about 4% by weight and about 5% by weight of milk protein. In yet a further embodiment according to the present invention, the yogurt-cheese-oil product comprises between about 2% by weight and about 52.5% by weight of an oil, more preferably between about 2% by weight and about 30% by weight of an oil, still more preferably between about 4% by weight and about 20% by weight of an oil, and yet more preferably between about 6% by weight and about 8% by weight of an oil. In another embodiment according to the present invention, the yogurt-cheese-oil product comprises between about 0.05% and about 0.09% by weight of cholesterol; between about 0.2% by weight and 0.4% by weight of sodium; and between about 58% by weight and 63% by weight of water.

In one embodiment according to the present invention, inulin is added to the yogurt-cheese-oil product. Inulin is a polysaccharide that is naturally found in many plants. Inulin has a mildly sweet taste and is filling like starchy foods, but is not normnally absorbed in human metabolism and therefore does not affect the sugar cycle. Inulin reduces the body's need to produce insulin, helping to restore normal insulin levels. In addition to being thus beneficial for diabetics, inulin contributes to the body of yogurt-cheese-oil products, making possible the incorporation of as much as between about 2% and about 4% more yogurt into a given yogurt-cheese-oil product. Inulin also is a prebiotic that extends the viability of the yogurt bacteria in the digestive tract of the consumer, so that their beneficial effects in the body are increased. Inulin may, however, be implicated in food allergies, and can potentially induce anaphylactic shock in some people. Other non-digestible oligosaccharides and oligosaccharides resistant to metabolism, collectively referred to herein as "digestion-resistant polysaccharides", such as lactulose and lactitol, can also be used. In one exemplary embodiment, inulin is added to the milkfat-oil fluid prior to pasteurization in step 130 discussed above.

Various highly processed dairy derivatives have the potential for use in modifying the flavor and texture of cream cheese products. These derivatives include, for example, milk protein concentrate, whole milk protein, whey protein concentrate, casein, Baker's cheese, yogurt powder and dry cottage cheese curd. Milk protein concentrate, for example, is produced by ultrafiltration of milk. Such materials could be added to the yogurt-cheese-oil product made in accordance with the present invention, or introduced during preparation of the product. However, their use is not preferred, and can by practice according to the present invention be minimized. Furthermore, addition of such agents generally is a poor substitute for the retention of whey from the milkfat fluid and the incorporation of yogurt, both such desirable results being as achieved in accordance with the present invention. In one embodiment according to the present invention, at least about 40% of the milk protein in the yogurt-cheese-oil product is derived from the milkfat fluid and yogurt. In another embodiment according to the present invention, at least about 50% of the milk protein in the yogurt-cheese-oil product, and potentially in excess of 60% of the milk protein in the yogurt-cheese-oil product, is derived from the milkfat fluid and yogurt. The balance of the protein may be derived, for example, from added nonfat dry milk and stabilizer.

Syneresis leads to an unattractive and wasteful phase separation between curds and whey when milk is directly coagulated. In one embodiment according to the present invention, the yogurt-cheese-oil product exhibits substantially no syneresis, or less than about 1% syneresis by weight, after 15 hours at a temperature within a range of between about 74° F. to about 75° F.

The texture and consistency of the yogurt-cheese-oil product made in accordance with one embodiment of the present invention is the same as that of ordinary cream cheese. In another embodiment according to the present invention, the yogurt-cheese-oil product has a consistency similar to that of brick butter.

Figure 3:
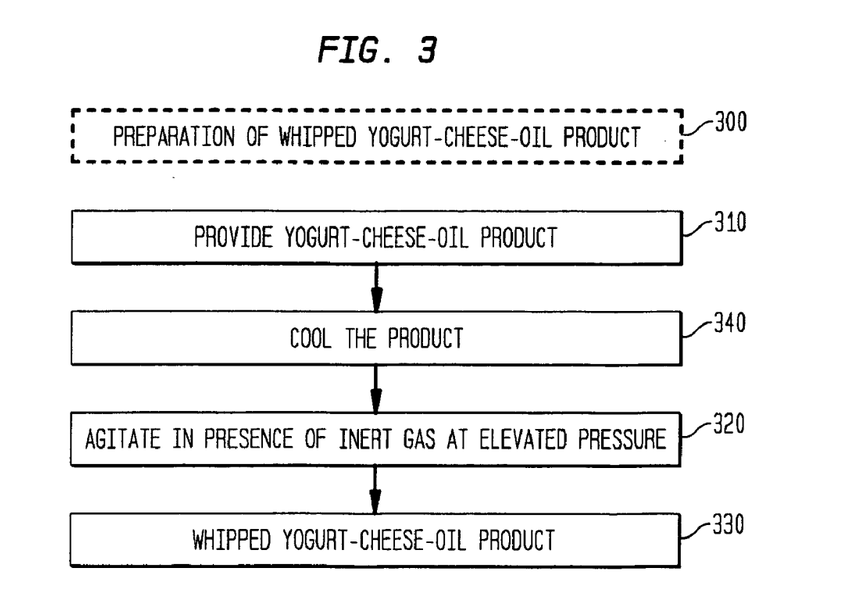
FIG. 3 is a flow chart of an exemplary process for making a whipped yogurt-cheese-oil product.

In yet a further embodiment according to the present invention, the consistency of the yogurt-cheese-oil product can be modified to yield a whipped, more easily spreadable product. Referring to FIG. 3, an exemplary process 300 for carrying out a whipping operation is shown. The process begins with providing a yogurt-cheese-oil product at step 310, in accordance with the above teachings. At step 320, the yogurt-cheese-oil product is agitated in the presence of an inert gas at an elevated pressure. For example, the yogurt-cheese-oil product can be passed through a confined space having an agitator, while being simultaneously subjected to an inert gas at an elevated pressure.

In one embodiment according to the present invention, the inert gas is provided at an initial pressure within a range of between about 150 PSI and about 240 PSI. In another embodiment according to the present invention, the inert gas is provided at an initial pressure within a range of between about 220 PSI and about 240 PSI. In yet a further embodiment according to the present invention, the pressure of the inert gas is controlled throughout the agitator in order to expose the yogurt-cheese-oil product to a desired pressure for a defined time as it travels through the agitator. In another embodiment according to the present invention, the inert gas is injected into the agitator at a chosen initial pressure, which is then permitted to dissipate in the region of the agitator. In one embodiment according to the present invention, the yogurt-cheese-oil product is exposed to a desired pressure for between about 3 seconds and about 6 seconds. In an additional embodiment according to the present invention, the yogurt-cheese-oil product is exposed to a desired pressure for between about 4 seconds and about 5 seconds. Although any inert gas can be used, nitrogen is the typical and most practical choice. By "inert" is meant a gas that does not cause or at least minimizes undesirable effects on the yogurt-cheese-oil product, its production, and the consumer.

Injection of a gas into the yogurt-cheese-oil product under high pressure is problematic due to the extreme density mismatch of the gas and the yogurt-cheese-oil product. The gas diffuses into the yogurt-cheese-oil product. Diffusion of the gas throughout the body of yogurt-cheese-oil product is not instantaneous even with agitation, effectively requiring a gas delivery pressure above and beyond that necessary for equalizing the prevailing pressure within the body of yogurt-cheese-oil product. This resistance to gas dispersion in the semi-solid yogurt-cheese-oil product can be ameliorated by employing an in-line gas injection system providing controllable gas injection pressure and preferably having a relatively large bore gas delivery orifice. A mass flow controller such as, for example, a GFC-171S mass flow controller commercially available from Aalborg Instruments & Controls, Inc., 20 Corporate Drive, Orangeburg, N.Y. 10962, can be used.

In one embodiment according to the present invention, the temperature of the yogurt-cheese-oil product is reduced at step 340, and so maintained or further modified during step 320. For example, a scraped surface heat exchanger, such as a Waukesha Cherry-Burrell Thermutator® or Votator®, can be used to provide the needed agitation while simultaneously controlling the temperature. In one embodiment according to the present invention, the temperature of the yogurt-cheese-oil product is reduced to a suitable inert gas injection temperature at step 340, and is then so maintained or further reduced during step 320. This temperature reduction at step 340 increases retention of the inert gas in the yogurt-cheese-oil product during subsequent step 320. In the absence of such a temperature reduction before injection of the inert gas, excessive escape of the inert gas from the yogurt-cheese-oil product prior to or during step 320 may retard the desired whipping process and result in a product having a less whipped texture than desired. In one embodiment according to the present invention, the yogurt-cheese-oil product is cooled at step 340 to an inert gas injection temperature within a range of between about 65° F. and about 68° F., and agitation in the presence of the inert gas at an elevated pressure is then carried out at a temperature within a range of between about 58° F. and about 62° F. within the agitator at step 320. Using higher temperatures counteracts the effect of the pressurized gas in causing the yogurt-cheese-oil product to expand into whipped form and accordingly is to be avoided. If desired, however, the yogurt-cheese-oil product may in general be cooled to a whipping temperature within a range of between about 65° F. and about 90° F., and more preferably cooled at least to about 80° F., at step 340. A temperature within a range of between about 58° F. and about 70° F., more preferably about 68° F. or lower, may then be employed within the agitator at step 320. Either or both of steps 340 and 320 can include multiple cooling steps that reduce the yogurt-cheese-oil product temperature in a staged, controlled manner. This cooling can be carried out, for example, with a smooth and gradual temperature reduction or in discrete steps. In one embodiment according to the present invention, step 340 is carried out immediately following completion of homogenization in step 185 or immediately following completion of acidification in step 190. For example, step 340 can be carried out in the outlet chamber of a homogenizer.

The agitation within the scraped surface heat exchanger may be controlled to a desired level in order to maintain the yogurt-cheese-oil product within the exchanger for an adequate time for the pressurized inert gas to act on the product. The normal operating speed of the agitator in a Waukesha Cherry-Burrell Thermutator® or Votator® may need to be reduced, for example to within a range of between about 800 and 1,000 revolutions per minute, in order to avoid excessive shear. In order to facilitate further reduction of the temperature of the yogurt-cheese-oil product in the course of passage through the scraped surface heat exchanger, such exchanger is equipped to withdraw heat from the product, which is then dissipated in a suitable manner. In one embodiment according to the present invention, two scraped surface heat exchangers are operated in series so that the yogurt-cheese-oil product is successively passed through both exchangers, which jointly cool and apply pressurized inert gas to the yogurt-cheese-oil product. In another embodiment according to the present invention, a Terlotherm® vertical scraped surface heat exchanger is employed. Terlotherm® machinery is commercially available from Terlet USA, 6981 North Park Drive, East Bldg., Suite 201, Pennsauken, N.J. 08109.

The resulting product indicated at 330 is a whipped yogurt-cheese-oil product. The texture and consistency of the yogurt-cheese-oil product made in accordance with one embodiment of the present invention is the same as that of ordinary cream cheese. The texture and consistency of the yogurt-cheese-oil product made in accordance with another embodiment of the present invention is the same as that of whipped butter.

Where it is desired to add solid adjuvants such as fruits, vegetables or nuts to the yogurt-cheese-oil product, they are preferably added after the whipping process is completed.

EXAMPLE 1

A batch of 1,500 pounds of pre-pasteurized heavy cream having a butterfat content of 44% is pumped into a kettle equipped with a heater and an agitator. Olive oil in an amount of 15.5 gallons (116 pounds) is added to the heavy cream. Sodium chloride in an amount of 11.4 pounds is added to the heavy cream. The cream is then heated with agitation to 85° F., whereupon 500 milligrams of pHage Control™ 604 cream cheese culture bacteria are added to the cream with agitation for 15 minutes. The cream is then maintained at 85° F. for 75 minutes. The butterfat content of the cream is then adjusted to 33% by weight by the addition with agitation of 195.8 pounds of nonfat dry milk and 180 pounds of water. After 15 minutes of agitation, 9.01 pounds of K6B493 stabilizer is added to the cream with agitation to thicken the mixture. The cream is then pasteurized by heating it with agitation to 165° F. and holding at that temperature for 15 minutes. The temperature of the resulting cheese-oil precursor is adjusted to 130° F. Approximately 29% by weight of the protein content in this cheese-oil precursor is derived from the cream; the balance being derived from the nonfat dry milk and stabilizer.

Meanwhile, yogurt is separately and simultaneously prepared. A batch of 312 pounds of condensed nonfat milk having a solids content of 33% by weight is provided. The solids content is adjusted to 20% by weight, by addition of 187 pounds of water. The condensed milk is then pasteurized by heating it with agitation to 165° F. and holding at that temperature for 15 minutes. The temperature of the condensed milk is then adjusted to 108° F., whereupon 250 milligrams of F-DVS YoFast®-10 yogurt culture bacteria are added to the condensed milk with agitation for 15 minutes. The condensed milk is then maintained at 108° F. for 6 hours. The resulting yogurt is then ready for combination with the cheese-oil precursor. Next, 470 pounds of the prepared yogurt is mixed into 1,880 pounds of the cheese-oil precursor with agitation. The mixture is cooled to a temperature of 125° F., and then homogenized by subjecting the mixture to a pressure of about 3,000 PSI at a temperature of 125° F. for about 5 seconds. The homogenized mixture is then acidified to a pH of about 4.5 by addition of 25 pounds of Stabilac® 12 Natural acid.

The resulting yogurt-cheese-oil product comprises about 25.9% by weight of butterfat; about 5% of oil, about 4.54% by weight of milk protein; about 0.0813% by weight of cholesterol; about 0.211% by weight of sodium; about 58.3% by weight of water; and about 41.7% by weight of solids. Concerning the protein content of this final product, approximately: 57% is derived from the nonfat dry milk together with the stabilizer; 23% is derived from the cream; and 20% is derived from the yogurt. The yogurt-cheese-oil product yields substantially no syneresis after 15 hours at about 74° F. to about 75° F.

EXAMPLE 2

A batch of 1,335 pounds of pre-pasteurized heavy cream having a butterfat content of 44% is pumped into a kettle equipped with a heater and an agitator. Olive oil in an amount of 8.8 gallons is added to the heavy cream. Sodium chloride in an amount of 13.68 pounds is added to the heavy cream. The cream is heated with agitation to 85° F., whereupon 500 milligrams of phage Control™ 604 cream cheese culture bacteria are added to the cream with agitation for 15 minutes. The cream is then maintained at 85° F. for 75 minutes. The butterfat content of the cream is then adjusted to 23.5% by weight by the addition with agitation of 244 pounds of nonfat dry milk and 765 pounds of water. After 15 minutes of agitation, 11.25 pounds of K6B493 stabilizer is added to the cream with agitation to thicken the mixture. The cream is then pasteurized by heating it with agitation to 165° F. and holding at that temperature for 15 minutes. The temperature of the resulting cheese-oil precursor is adjusted to 128° F. Approximately 54% by weight of the protein content in this cheese-oil precursor is derived from the cream; the balance being derived from the nonfat dry milk and stabilizer.

Yogurt is separately and simultaneously prepared in the same manner as described in Example 1. Next, 500 pounds of the prepared yogurt is mixed into 2,421 pounds of the cheese-oil precursor with agitation. The mixture is cooled to a temperature of 125° F., and then homogenized by subjecting the mixture to a pressure of about 3,000 PSI at a temperature of 125° F. for about 5 seconds. The homogenized mixture is then acidified to a pH of about 4.5 by addition of 25 pounds of Stabilac® 12 Natural acid.

The resulting yogurt-cheese-oil product comprises about 18.74% by weight of butterfat; about 3% of oil; about 8.85% by weight of milk protein; about 0.0613% by weight of cholesterol; about 0.331% by weight of sodium; about 49.77% by weight of water; and about 50.23% by weight of solids. Concerning the protein content of this final product, approximately: 40.2% is derived from the nonfat dry milk together with the stabilizer; 47.1% is derived from the cream; and 12.7% is derived from the yogurt. The yogurt-cheese-oil product yields less than about 1% syneresis by weight after 15 hours at about 74° F. to about 75° F.

While the present invention has been disclosed in a presently preferred context, it will be recognized that the present teachings may be adapted to a variety of contexts consistent with this disclosure and the claims that follow. For example, the process shown in the figures and discussed above can be adapted in the spirit of the many optional parameters described, to yield a variety of yogurt-cheese-oil products having a broad range of milkfat and oil concentrations.

We claim:

1. A process comprising steps of
providing a pasteurized milkfat-oil fluid including butterfat and an edible oil;
causing a pH of the milkfat-oil fluid to be slightly reduced, by inoculating the pasteurized milkfat-oil fluid with mesophilic lactic acid-producing bacteria, and then culturing the mesophilic bacteria to produce lactic acid in the milkfat-oil fluid, and then pasteurizing the milkfat-oil fluid before the mesophilic bacteria substantially digest the milkfat-oil fluid, forming a precursor;
combining the precursor with a yogurt, forming a combined precursor; and
homogenizing and acidifying the combined precursor; producing a yogurt-cheese-oil product.

2. The process of claim 1, wherein forming the precursor includes pasteurizing the milkfat-oil fluid when the mesophilic bacteria have caused a slight thickening of the milkfat-oil fluid.

3. The process of claim 1, including the step of incorporating in the yogurt-cheese-oil product a non-digestible oligosaccharide or a digestion-resistant polysaccharide.

4. The process of claim 1, including the step of incorporating inulin, lactulose or lactitol in the yogurt-cheese-oil product.

5. The process of claim 1, wherein providing the pasteurized milkfat-oil fluid includes providing a pasteurized fluid that contains whole milk, cream, skim milk, or reconstituted dry milk.

6. The process of claim 1, wherein forming the combined precursor includes inoculating the precursor with live and active lactic acid-producing yogurt bacteria, and wherein the process includes, before the homogenizing and acidifying, the step of then culturing the lactic acid-producing yogurt bacteria to produce lactic acid in the combined precursor until a pH of the combined precursor is significantly reduced to one point within a range of between about 5.0 and about 4.1.

7. The process of claim 6, wherein acidifying the combined precursor includes causing the pH of the combined precursor to be further reduced to another point within the range being lower than the one point, by combining, with the combined precursor, an edible acid supplementing the lactic acid produced by the yogurt bacteria.

8. The process of claim 6, wherein providing the pasteurized milkfat-oil fluid includes providing a pasteurized fluid that contains whole milk, cream, skim milk, or reconstituted dry milk.

9. The process of claim 6, wherein combining the precursor with the yogurt includes combining the precursor with a yogurt containing the live and active lactic acid-producing yogurt bacteria.

10. The process of claim 6, wherein inoculating the precursor with live and active lactic acid-producing yogurt bacteria includes inoculating the precursor with live and active probiotic lactic acid-producing yogurt bacteria being of a strain that includes *Lactobacillus delbrueckii* subspecies *bulgaricus, Streptococcus thermophilus, Lactobacillus acidophilus, Bifidobacterium,* or *Lactobacillus paracasei* subspecies *casei.*

11. The process of claim 4, wherein causing the pH of the combined precursor to be further reduced to another point includes reducing the pH to within a further range of between about 4.6 and about 4.4.

12. The process of claim 1, wherein inoculating the pasteurized milkfat-oil fluid includes inoculating the pasteurized milkfat-oil fluid with mesophilic lactic acid-producing bacteria being of a strain that includes *Lactococcus lactis lactis, Lactococcus lactis cremoris, Lactococcus lactis diacetylactis,* or *Leuconostoc.*

13. The process of claim 6, wherein inoculating the pasteurized milkfat-oil fluid includes inoculating the pasteurized milkfat-oil fluid with mesophilic lactic acid-producing bacteria being of a strain that includes *Lactococcus lactis lactis, Lactococcus lactis cremoris, Lactococcus lactis diacetylactis,* or *Leuconostoc.*

14. The process of claim 13, wherein inoculating the precursor with live and active lactic acid-producing yogurt bacteria includes inoculating the precursor with live and active probiotic lactic acid-producing yogurt bacteria being of a strain that includes *Lactobacillus delbrueckii* subspecies *bulgaricus, Streptococcus thermophilus, Lactobacillus acidophilus, Bifidobacterium,* or *Lactobacillus paracasei* subspecies *casei.*

15. A process comprising steps of:
providing a pasteurized milkfat-oil fluid including butterfat and an edible oil;
inoculating the pasteurized milkfat-oil fluid with mesophilic lactic acid-producing bacteria being of a strain that includes *Lactococcus lactis lactis, Lactococcus lactis cremoris, Lactococcus lactis diacetylactis,* or *Leuconostoc;*
culturing the mesophilic bacteria to produce lactic acid in the milkfat-oil fluid, and then pasteurizing the milkfat-oil fluid, forming a precursor;
combining the precursor with a yogurt, forming a combined precursor; and
homogenizing and acidifying the combined precursor; producing a yogurt-cheese-oil product.

16. The process of claim 15, including the step of incorporating in the yogurt-cheese-oil product a non-digestible oligosaccharide or a digestion-resistant polysaccharide.

17. The process of claim 15, including the step of incorporating inulin, lactulose or lactitol in the yogurt-cheese-oil product.

18. The process of claim 15, wherein providing the pasteurized milkfat-oil fluid includes providing a pasteurized fluid that contains whole milk, cream, skim milk, or reconstituted dry milk.

19. The process of claim 15, wherein forming the combined precursor includes inoculating the precursor with live and active lactic acid-producing yogurt bacteria, and wherein the process includes, before the homogenizing and acidifying, the step of then culturing the lactic acid-producing yogurt bacteria to produce lactic acid in the combined precursor until a pH of the combined precursor is significantly reduced to one point within a range of between about 5.0 and about 4.1.

20. The process of claim 19, wherein acidifying the combined precursor includes causing the pH of the combined precursor to be further reduced to another point within the range being lower than the one point, by combining, with the combined precursor, an edible acid supplementing the lactic acid produced by the yogurt bacteria.

21. The process of claim 19, wherein providing the pasteurized milkfat-oil fluid includes providing a pasteurized fluid that contains whole milk, cream, skim milk, or reconstituted dry milk.

22. The process of claim 19, wherein combining the precursor with the yogurt includes combining the precursor with a yogurt containing the live and active lactic acid-producing yogurt bacteria.

23. The process of claim 19, wherein inoculating the precursor with live and active lactic acid-producing yogurt bacteria includes inoculating the precursor with live and active probiotic lactic acid-producing yogurt bacteria being of a strain that includes *Lactobaciflus delbrueckii* subspecies *bulgaricus, Streptococcus thermophiles, Lactobacillus acidophilus, Bifidobacterium*, or *Lactobacillus paracasei* subspecies *casei*.

* * * * *